(12) United States Patent
Seetharam et al.

(10) Patent No.: US 11,914,734 B2
(45) Date of Patent: *Feb. 27, 2024

(54) SYSTEM AND METHOD FOR PROTECTING CONTENT

(71) Applicant: ARRIS Enterprises LLC, Suwanee, GA (US)

(72) Inventors: Ananth Seetharam, Bangalore (IN); Sean J. Higgins, Auckland (NZ); Paul R. Osborne, Auckland (NZ)

(73) Assignee: ARRIS Enterprises LLC, Suwanee, GA (US)

( * ) Notice: Subject to any disclaimer, the term of this patent is extended or adjusted under 35 U.S.C. 154(b) by 353 days.

This patent is subject to a terminal disclaimer.

(21) Appl. No.: 17/235,753

(22) Filed: Apr. 20, 2021

(65) Prior Publication Data

US 2021/0240847 A1 Aug. 5, 2021

Related U.S. Application Data

(63) Continuation of application No. 16/119,335, filed on Aug. 31, 2018, now Pat. No. 10,984,121.

(Continued)

(51) Int. Cl.
*H04L 9/40* (2022.01)
*G06F 21/62* (2013.01)
(Continued)

(52) U.S. Cl.
CPC .......... *G06F 21/6218* (2013.01); *G06F 21/10* (2013.01); *G06F 21/105* (2013.01);
(Continued)

(58) Field of Classification Search
None
See application file for complete search history.

(56) References Cited

U.S. PATENT DOCUMENTS 6,829,708 B1 * 12/2004 Peinado ............. H04L 63/0442
713/176
7,065,507 B2 6/2006 Mohammed et al.
(Continued)

FOREIGN PATENT DOCUMENTS

WO 2008/130191 A1 10/2008
WO 2008130191 A1 10/2008
WO WO-2008130191 A1 * 10/2008 ............. H04H 60/14

OTHER PUBLICATIONS

European Search Report RE: Application No. EP21187312.0, dated Feb. 17, 2022.
(Continued)

*Primary Examiner* — Joseph P Hirl
*Assistant Examiner* — Hassan Saadoun
(74) *Attorney, Agent, or Firm* — Chernoff, Vilhauer, McClung & Stenzel, LLP

(57) ABSTRACT

A method for protecting content, comprising receiving, from a client device, a request for an encryption key for encrypting the content comprising a reference associated with the client device, identifying a set of supported security capabilities corresponding to the reference associated with the client device, identifying a set of required security capabilities corresponding to the content associated with the key request, determining if the set of supported security capabilities satisfy the set of required security capabilities, and in response to determining that the supported security capabilities satisfy the set of required security capabilities, transmitting the encryption key to the client device.

20 Claims, 10 Drawing Sheets

Related U.S. Application Data

(60) Provisional application No. 62/552,908, filed on Aug. 31, 2017.

(51) Int. Cl.
*G06F 21/60* (2013.01)
*G06F 21/10* (2013.01)

(52) U.S. Cl.
CPC ........ *G06F 21/602* (2013.01); *G06F 21/6209* (2013.01); *H04L 63/062* (2013.01); *H04L 63/205* (2013.01); H04L 63/0442 (2013.01); H04L 63/0876 (2013.01); H04L 2463/062 (2013.01); H04L 2463/101 (2013.01); H04L 2463/103 (2013.01)

(56) References Cited

U.S. PATENT DOCUMENTS

| | | | | |
|---|---|---|---|---|
| 7,080,043 | B2* | 7/2006 | Chase, Jr. | G06F 21/10 380/231 |
| 7,136,838 | B1* | 11/2006 | Peinado | G06Q 20/3678 705/52 |
| 7,319,759 | B1* | 1/2008 | Peinado | H04L 9/0891 380/46 |
| 9,847,979 | B2 | 12/2017 | Peterka et al. | |
| 2003/0016829 | A1* | 1/2003 | Chu | G06F 21/10 713/193 |
| 2010/0186065 | A1* | 7/2010 | Chung | H04N 7/1675 726/1 |
| 2012/0284802 | A1* | 11/2012 | Hierro | G06F 21/10 726/27 |
| 2016/0364553 | A1* | 12/2016 | Smith | H04L 63/0428 |

OTHER PUBLICATIONS

PCT International Search Report & Written Opinion, Re: Application No. PCT/US2018/049162, dated Nov. 12, 2018.

\* cited by examiner

| Group | RSC |
|---|---|
| Gp1 | XHV |
| Gp2 | HV |

408

| Asset | Group |
|---|---|
| Asset1 (MKid1) | Gp1 |
| Asset2 (MKid2) | Gp2 |

410

400

:Admin (402) → :Server (404)
configureRSCForGroup(GroupID, RSC)

:Encryptor (406) → :Server (404)
requestKey(AssetID, GroupID)
encryptionKey, mediaKeyID

FIG. 4

SYSTEM AND METHOD FOR PROTECTING CONTENT

CROSS REFERENCE TO RELATED APPLICATION

The present application is a continuation of U.S. application Ser. No. 16/119,335 filed on Aug. 31, 2018 which claims benefit of U.S. Provisional Patent Application No. 62/552,908 entitled "SYSTEM AND METHOD FOR PROTECTING CONTENT," by Ananth Seetharam, Sean Higgins and Paul Osbourne, filed Aug. 31, 2017, which application is hereby incorporated by reference herein.

FIELD

The present disclosure relates to protection of high value content, specifically the technological improvement of ensuring that security capabilities of a client device conform to a set of security constraints.

BACKGROUND

Content studios and service providers often want high value content to be played and/or processed on only those devices (or clients) that are guaranteed to conform to a set of security constraints. The high value content is suitably encrypted and a goal is to ensure that encryption keys used in the encryption of the high value content are secure.

The security constraints may be delivered in a license to the client. The client may report its security capabilities to the content studios and service providers. However, the content studios and service providers risk that a client does not report correct information either through mistake or intentional deception. Additionally, security constraints may be modified by the content studios and service providers without being updated by the client.

Modifying the security constraints may introduce operational complexity in client software management and consequently heightens the risk of a poor client experience.

Thus, there is a need for a technological solution to protect high value content with a changing set of security constraints (capabilities) required by the content of the service provider and supported by the client. The technical solution should not need to trust clients, should not increase operational complexity, should not hamper an end user experience, and should not increase complexity of content and/or software management.

SUMMARY

A method for protecting content, comprising receiving, from a client device, a request for an encryption key for encrypting the content comprising a reference associated with the client device, identifying a set of supported security capabilities corresponding to the reference associated with the client device, identifying a set of required security capabilities corresponding to the content associated with the key request, determining if the set of supported security capabilities satisfy the set of required security capabilities, and in response to determining that the supported security capabilities satisfy the set of required security capabilities, transmitting the encryption key to the client device.

A digital rights management system comprising a receiving device for receiving an encryption key request from a client device, a transmitting device for transmitting the encryption key to the client device, a first database for storing a set of supported security capabilities corresponding to client device, a second database for storing a set of required security capabilities corresponding to at least one of the encryption key and content associated with the encryption key, and a processing device. The processing device may be configured to identify, in the first database, the set of supported security capabilities corresponding to the client device, identify, in the second database, the set of required security capabilities corresponding to the content associated with the encryption key, determine if the set of supported security capabilities satisfy the set of required security capabilities, and, in response to determining that the supported security capabilities satisfy the set of required security capabilities, transmit the encryption key to the client device via the transmitting device.

BRIEF DESCRIPTION OF THE DRAWINGS

The scope of the present disclosure is best understood from the following detailed description of exemplary embodiments when read in conjunction with the accompanying drawings. Included in the drawings are the following figures:

FIG. 4 is a diagram illustrating a process for requesting an encryption key and configuring groups of required security capabilities.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Configuring Required Security Capabilities

Figure 1A:
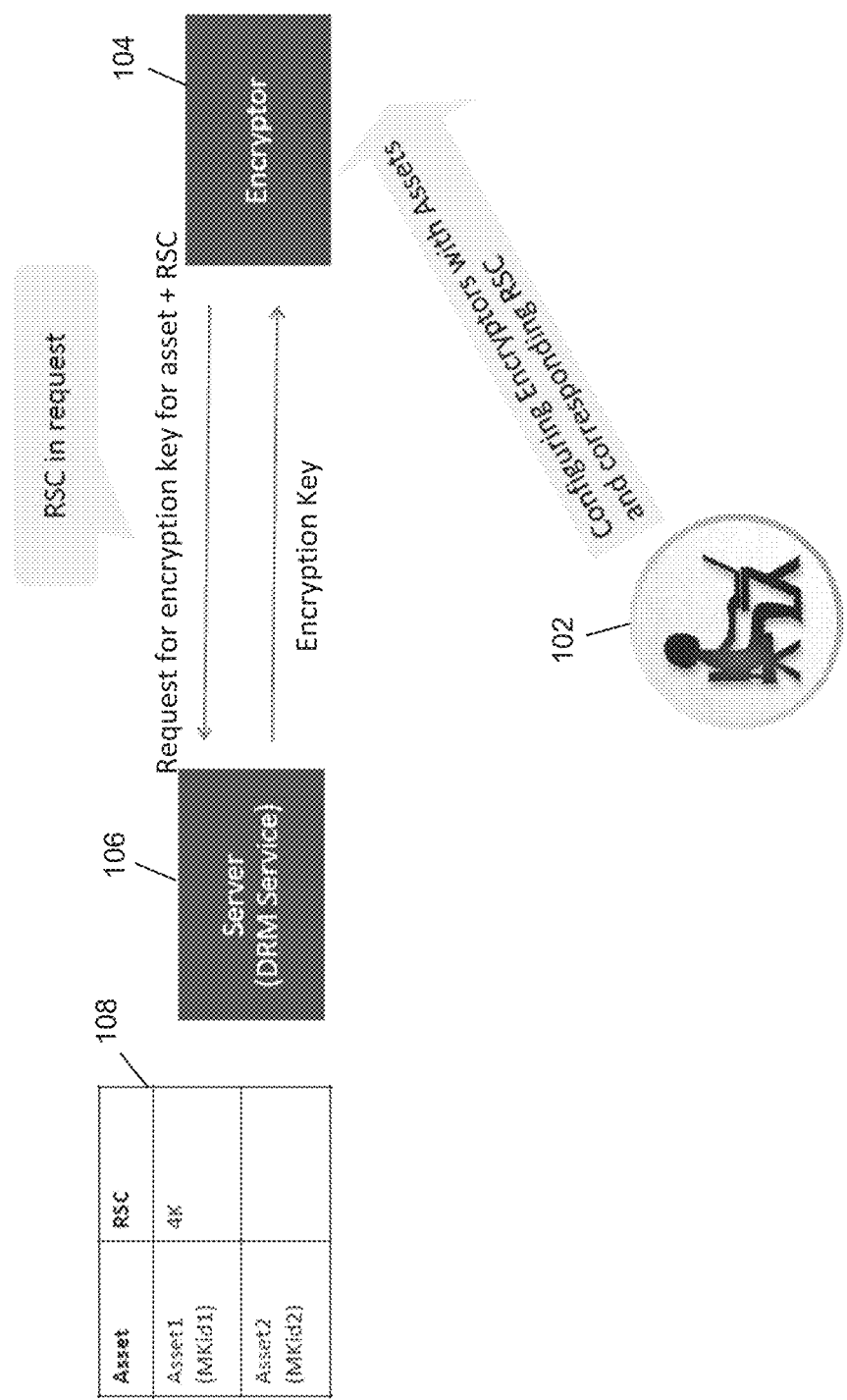
FIGS. 1A and 1B are illustrative diagrams of a high level system for the protection of content by configuring required security capabilities of the content.
Figure 1B:
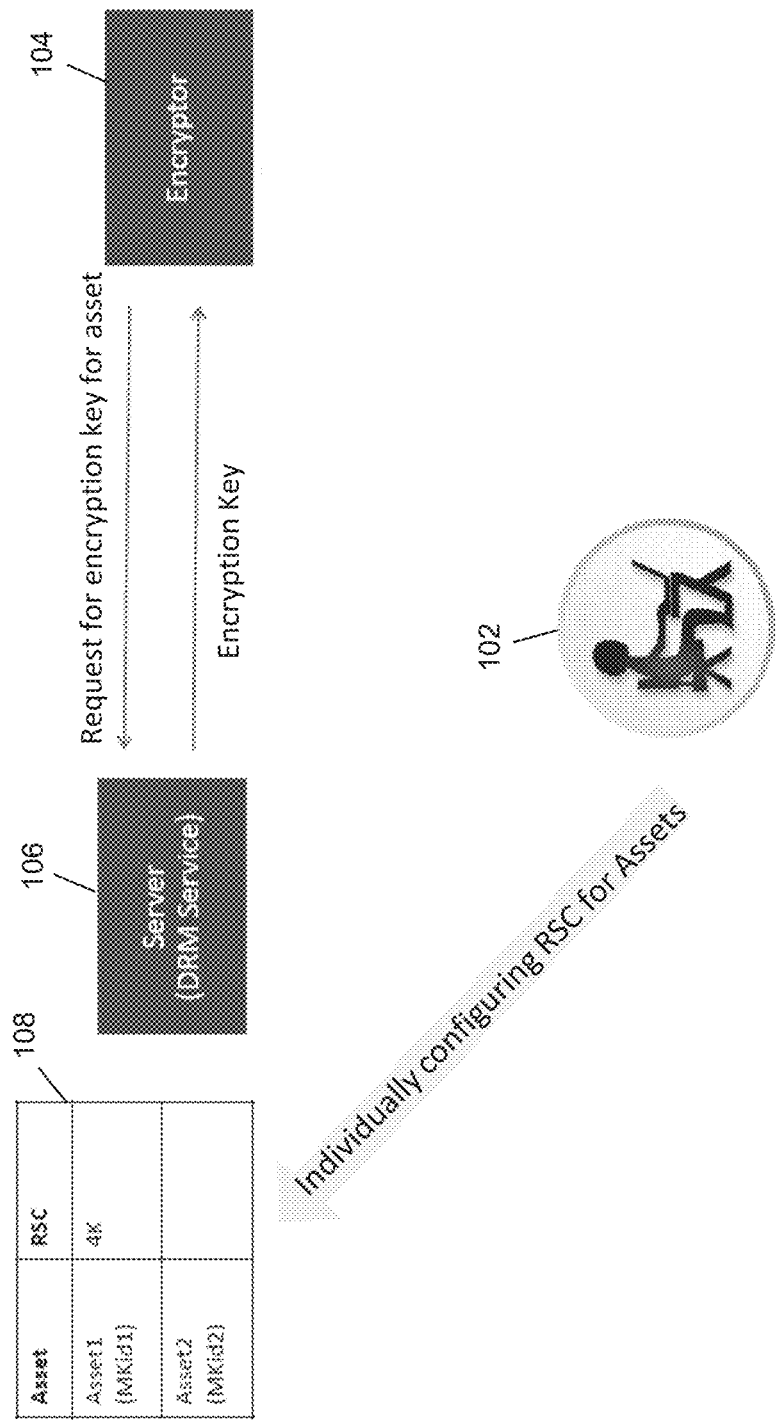

FIGS. 1A and 1B illustrate a system 100 providing protection of content by configuring required security capabilities of the content. The system 100 may comprise a user 102, an encryptor 104, and a server 106. In one embodiment, such as FIG. 1B, the user 102 may communicate directly with the server 106 and the system 100 may not comprise the encryptor 104. In another embodiment, such as FIG. 1A, the user 102 may communicate with the encryptor 104 and the encryptor 104 may communicate with the server 106.

The user 102 may be an administrator that may configure the encryptor 104. One of skill in the art will appreciate that the user 102 may be any individual working for a service provider, a plurality of people working for the service provider, the service provider itself, or any other combination of representation of the service provider. The user 102 may configure the encryptor 104 with content (asset may refer to an instance of the content). The user 102 may also configure the encryptor 104 with required security capabilities (RSC) for the content. In one embodiment, the content may comprise media content, such as, but not limited to, audio content and/or video content. The content may also comprise a media manifest. The media manifest may be a descriptor of the content that may be used by players and/or processors. The media manifest may also be used by other content processing functions (e.g., play, copy, etc.) on devices as well as for decrypting the content.

The content may be accessed by a client for playing on a client device. A client device may be any type of computing device suitable for playing content, such as a desktop computer, laptop computer, tablet computer, notebook computer, cellular phone, smart phone, smart watch, smart television, set-top box, etc. The client device may request an encryption key for decrypting the media. The client device may comprise an asset decryptor for decrypting the asset. In one embodiment, the RSC for the content may be extended to be RSC for accessing the encryption key. In one embodiment of media content, the encryption key may comprise a media encryption key, also referred to as a media key.

The RSC may be a set of security capabilities, also referred to as security constraints, required to access the content and/or the encryption key associated with the content. Each client device may comprise a set of supported security capabilities (SSC) which are a set of security capabilities supported by the client device.

The user 102 may modify the RSC required by a given asset. In one embodiment, as an asset gets older, the RSC may be downgraded. Additionally, the SSC of a client device may vary. The server 106 may store the SSC corresponding with the client device. In one embodiment, the client device may be tested in order to establish and/or verify the SSC. With further testing, confidence may increase and/or decrease and the associated SSC may be modified. Further configurations by the user 102, may include defining terms that may be related to a set of security capabilities. For example, the term "4K" may represent a proprietary set of security capabilities. Changes in configurations may occur without requiring a re-encoding of the content and/or an update to software of the client device. One of skill in the art will appreciate that many configurations to RSC and SSC may be made by the user 102.

In one embodiment, the RSC of the asset may be automatically derived from metadata of the asset. The metadata may be re-evaluated to see if the RSC may need to be updated. In one embodiment, the re-evaluation of the metadata may be automatic and occur periodically, a-periodically, or otherwise. In another embodiment, the user 102 may initiate re-evaluation of the metadata.

The server 106 may be an equipment device, a set of equipment devices, a cloud server, or any other server known to those of skill in the art. In on embodiment, the server 106 may comprise a digital rights management (DRM) server that may be configured to provide a DRM service. The DRM service may offer access control measures for technology comprising proprietary and/or copyrighted material. The server 106 may comprise a database 108 (or databases) corresponding a plurality of assets to the plurality of RSCs established by the user 102. In one embodiment, the asset may comprise a media key identification (MKid) of the media encryption key that corresponds to a proprietary RSC configuration, such as "4K."

The client device may provide a reference in a request for the encryption key to the server 106. The server 106 may be remote from the client device. The server 106 may identify, or reference, the SSC corresponding to the client device. The reference may be unspoofable. The client device may be prevented from presenting a SSC that is better than the SSC that has been verified and stored in the server 106. The server 106 may also identify the RSC corresponding to the encryption key and/or content corresponding to the encryption key.

The server 106 may determine if the SSC satisfies the RSC. In one embodiment, the SSC may be required to be identical to the RSC. In another embodiment, the SSC may satisfy the RSC by comprising the RSC and additional security capabilities. In response to determining that the SSC satisfies the RSC, the server 106 may transmit the encryption key to the client device. In response to determining that the SSC does not satisfy the RSC, the server 106 may withhold the encryption key from the client device. One of skill in the art will appreciate that a plurality of methods exist for determining that the SSC may satisfy the RSC. In one embodiment, the server 106 may transmit a message to the client device in response to determining that the SSC does not satisfy the RSC. One of skill in the art will appreciate that methods by a remote server to withhold a requested encryption key based on a mismatch between the SSC and RSC are taught by the embodiments discussed herein.

In one embodiment, the server 106 may be configured with the RSC for the encryption key. The server 106 may also be configured with the SSC for the client device. The SSC may be identified by a decryption key identification. The decryption key identification may further identify a class of client devices. The decryption key identification may be required for communication with the class of client devices.

The SSC and RSC may be configured in a vocabulary that may reflect a characterization of security capabilities by the user 102. The client device may request the encryption key from the server 106. The request may reference the client device. One of skill in the art will appreciate that the request may be made via a plurality of communication methods, such as, but not limited to, HTTP, TCP, IP, etc.

The decryption key identification of the client device may refer to a key pair comprising a private key and a public key. In one embodiment, the private key may be embedded in a whitebox on the client device. In another embodiment, the private key may be hidden in secure hardware on the client device. The server 106 may look up the public key corresponding to the decryption key identification of a request from the client device to the server 106.

The server 106 may respond with a session key and a session key identification encrypted with an intermediate key that may be encrypted with the public key of the key pair. The client device corresponding with the key pair may be the only client device that may decrypt the session key.

The server 106 may maintain a mapping between the session key provided to the client device and the decryption key identification provided by the client device. The client may make a request for a media encryption key to the server 106. The request may state a media key identification corresponding to the media encryption key. The request may be encrypted with the session key.

The server 106 may decrypt the request using the session key corresponding to the session key identification. On a successful decryption, the server 106 may identify the SSC corresponding to the client device. In one embodiment, the server 106 may identify the SSC based on the client provided session key identification.

In one embodiment, changes to the session key identification may lead to the request not being decrypted by the server 106. As such, the decryption key identification associated with the session key identification may serve as an unspoofable reference.

The server 106 may then determine if the SSC of the client device matches the RSC of the requested media encryption key. In response to determining that the SSC satisfies the RSC, the server 106 may respond to the client device and provide the media encryption key.

Thus, the methods and systems discussed herein provide for a technological improvement over existing systems and methods for protecting content by using an SSC and RSC.

Equipment Device

Figure 2:
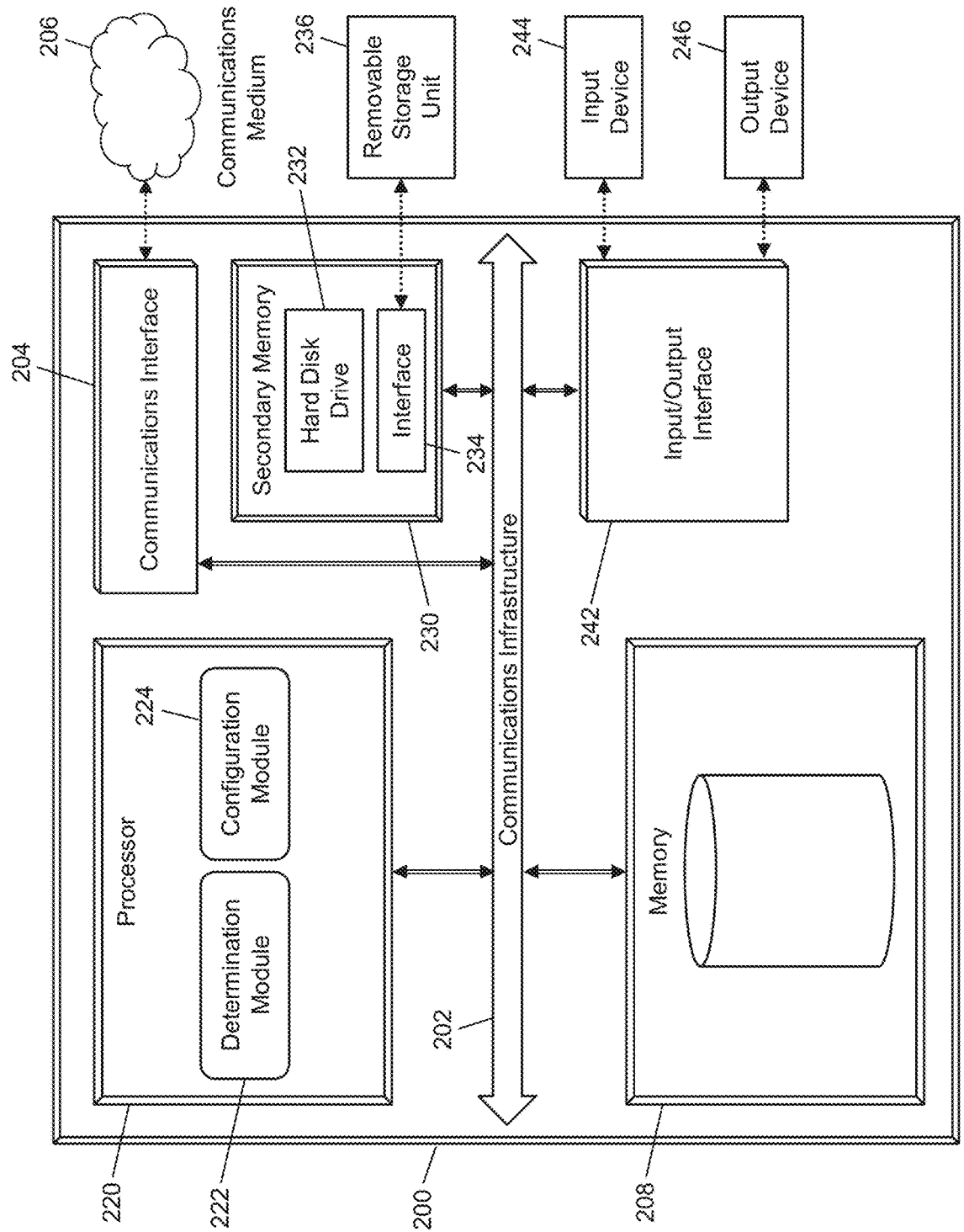
FIG. 2 is a block diagram illustrating an equipment device of the system of FIGS. 1A and 1B for the protection of content by configuring required security capabilities of the content.

FIG. 2 illustrates an embodiment of an equipment device 200 of the server 106 in the system 100. It will be apparent to persons having skill in the relevant art that the embodiment of the equipment device 200 of the server 106 illustrated in FIG. 2 is provided as illustration only and may not be exhaustive to all possible configurations of the equipment device 200 suitable for performing the functions as discussed herein.

The equipment device 200 may include a communications infrastructure 202. The communications infrastructure 202 may be configured to transmit data between modules, engines, databases, memories, and other components of the equipment device 200 for use in performing the functions discussed herein. The communications infrastructure 202 may be comprised of one or more communication types and utilizes various communication methods for communications within a computing device. For example, the communications infrastructure 202 may be comprised of a bus, contact pin connectors, wires, etc. In some embodiments, the communications infrastructure 202 may also be configured to communicate between internal components of the equipment device 200 and external components of the equipment device 200, such as externally connected databases, display devices, input devices, etc.

The equipment device 200 may also include a communications interface 204. The communications interface 204 may include one or more interfaces used to interact with and facilitate communications between the equipment device 200 and one or more external devices via suitable communications mediums 206. For instance, the communications interface 204 may interface with the communications infrastructure 202 and provide an interface 204 for connecting the equipment device 200 to one or more communications mediums 204 for the electronic transmission or receipt of data signals that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, the Internet, radio frequency, Bluetooth, near field communication, etc.

In some instances, the equipment device 200 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded thereon. For example, the communications interface 204 may include (e.g., or otherwise have access to, such as via the communications infrastructure 204) a parser program configured to receive and transform the received data signal into usable input for the functions performed by the processing device to carry out the methods and systems described herein. The communications interface 204 may be configured to receive data signals electronically transmitted through a communications medium 206.

The equipment device 200 may also include a memory 208. The memory 208 may be configured to store data for use by the equipment device 200 in perform the functions discussed herein. The memory 208 may be comprised of one or more types of memory using one or more suitable types of memory storage, such as random access memory, read-only memory, hard disk drives, solid state drives, magnetic tape storage, etc. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The equipment device 200 may also include a processor 220. The processor 220 may be configured to perform the functions of the equipment device 200 discussed herein as will be apparent to persons having skill in the relevant art. In some embodiments, the processor 220 may include and/or be comprised of a plurality of engines and/or modules specially configured to perform one or more functions of the processing device, such as a determination module 222, configuration module 224, etc. As used herein, the term "module" may be software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores." Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

The processor 220 of the equipment device 200 may include a determination module 222. The determination module 222 may be configured to execute queries on databases to identify information and compare the information.

The determination module 222 may receive one or more data values or query strings, and may execute a query string based thereon on an indicated database to identify information stored therein. The determination module 222 may then compare the identified information to determine if a condition is satisfied.

The processor 220 of the equipment device 200 may also include a configuration module 224. The configuration module 224 may be configured to manage the configuration of data on the equipment device 200. For instance, the configuration module 224 may be configured to access information for a specified entity and modify that information to a new value.

In some embodiments, the equipment device 200 may also include a secondary memory 230. The secondary memory 230 may be another memory in addition to the memory 208 that may be used to store additional data for use in performing the functions of the equipment device 200 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc.

In some embodiments, the equipment device 200 may also include an input/output interface 242. The input/output interface 242 may be configured to interface the equipment device 200 with one or more input devices 244 and/or output devices 246 for the transmission to and receipt of data from the respective devices. The input/output interface 242 may include any suitable type of interface, and in some instances may include multiple types of interfaces, such as for interfacing with multiple types of input devices 244 and/or output devices 246. Input devices 244 may include any suitable type of device for inputting data to an equipment device 200, such as a keyboard, mouse, microphone, camera, touch screen, click wheel, scroll wheel, remote control, etc. Input devices 244 may be configured to receive input from a user of the equipment device 200, such as the user 102, which may include an instruction submitted to configure an RSC of an encryption key. Output devices 246 may include any suitable type of device for outputting data from an equipment device 200, such as a speaker, remote control, headset, tactile feedback device, etc.

Process for Requesting Encryption Key and Configuring RSC Groups

Figure 3:
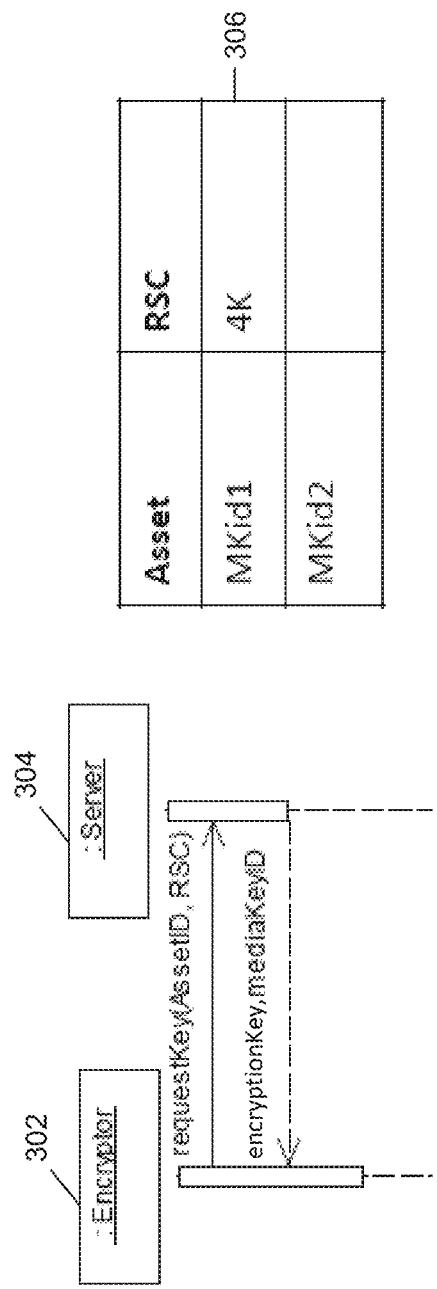
FIG. 3 is a diagram illustrating a process for requesting an encryption key and configuring a required security capability.

FIGS. 3 and 4 illustrate processes 300, 400 for requesting an encryption key and configuring groups of required security capabilities.

In process 300, an encryptor 302, such as encryptor 104, may request an encryption key from a server 304, such as server 106. The server 106 may comprise a database of corresponding asset identifications and RSC for the asset. In process 400, an administrator 402 may configure groups of assets and/or RSCs on a server 404. The server 404 may comprise a database 408 with groups corresponding to different RSCs, such as, for example, "XHV," HV." An encryptor 406 may request an encryption key for a group of assets from the server 404. The server may comprise a database 410 that may correspond the groups of database 408 with asset identifications. In one embodiment, databases 408 and 410 may be a same database. In another embodiment, databases 408 and 410 may be separate databases.

In one embodiment, a set of media key identifications may be grouped together in the server 404. The server 404 may be configured to lookup the group to identify the corresponding RSC.

In an embodiment, a whitebox of a client device may be achieved through software.

In an embodiment, the server 404 may identify a list of SSCs corresponding to a client device and determine if the RSC is in the list of SSCs.

In an embodiment, an unspoofable reference may identify a single client device. In an embodiment, a service provider, also referred to as a user, may term security capabilities as high value (HV), very high value (VHV), and extremely high value (XHV). The service provider may change an asset's RSC from XHV to VHV and further to HV over time, or in response to other changes in conditions. In another embodiment, the service provider may change an asset's RSC from "NewRelease" to "CurrentRelease" and further to "OldRelease."

Figure 5:
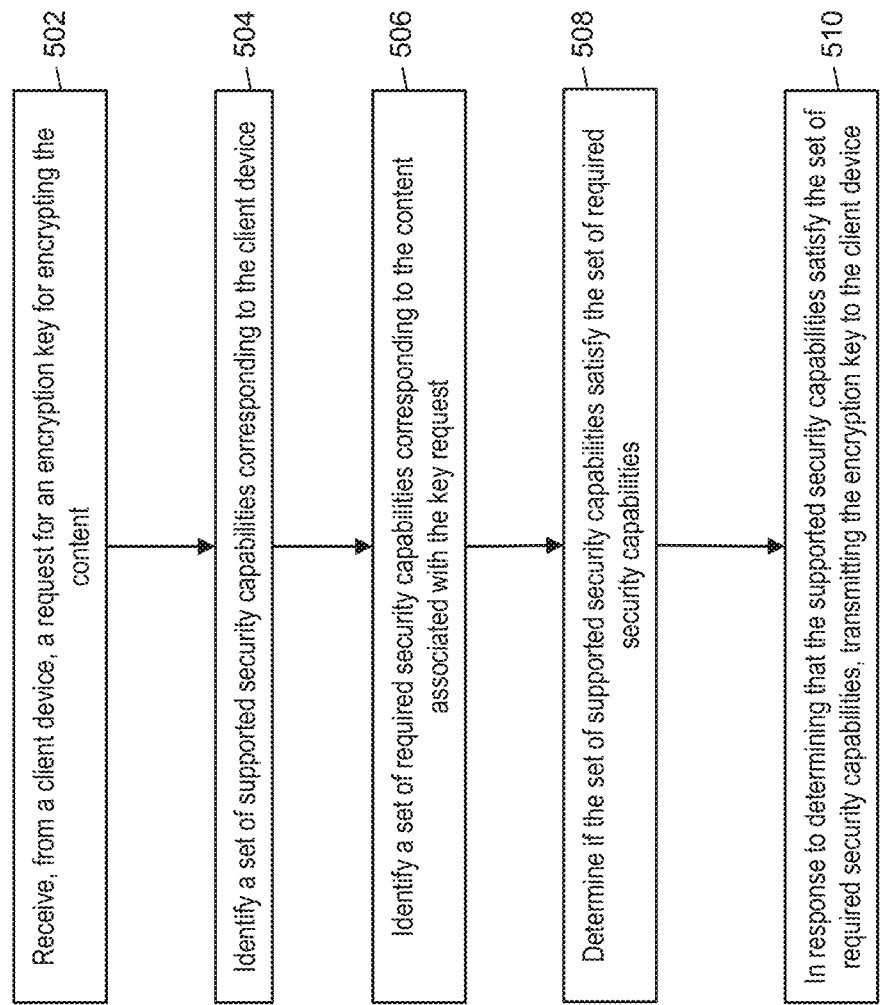
FIG. 5 is a flow chart illustrating an exemplary method for protecting content by configuring required security capabilities of the content.

In an embodiment, with further testing of a client device, the SSC of the client device may change from HV to VHV to XHV. In an embodiment, in response to a client device being exploited, no security capabilities or SSC may be assigned as corresponding to the client device Exemplary Method for Protecting Content by Configuring RSC FIG. 5 illustrates a method 500 for protecting content by configuring required security capabilities of the content. Step 502 may comprise a server, such as server 106, receiving, from a client device, a request for an encryption key for encrypting the content.

Step 504 may comprise identifying a set of supported security capabilities corresponding to the client device. In one embodiment, the supported security capabilities may be configurable. Step 506 may comprise identifying a set of required security capabilities corresponding to the content associated with the key request. In one embodiment, the required security capabilities may be configurable.

Step 508 may comprise determining if the set of supported security capabilities satisfy the set of required security capabilities. In one embodiment, determining if the set of supported security capabilities satisfy the set of required security capabilities may comprise determining if the set of supported security capabilities exactly matches the set of required security capabilities. In another embodiment, determining if the set of supported security capabilities satisfy the set of required security capabilities may comprise determining if the set of supported security capabilities includes at least the set of required security capabilities. In yet another embodiment, the set of supported security capabilities may be configured to be ordered by increasing security capabilities listed in the set of required security capabilities and determining if the set of supported security capabilities satisfy the set of required security capabilities may comprise determining if the set of supported security capabilities are equal or greater to required security capabilities of the set of security capabilities according to the order of required security capabilities.

Step 510 may comprise, in response to determining that the supported security capabilities satisfy the set of required security capabilities, transmitting the encryption key to the client device. In one embodiment, in response to determining that the supported security capabilities do not satisfy the set of required security capabilities, the server may withhold the encryption key from the client device.

Figure 6:
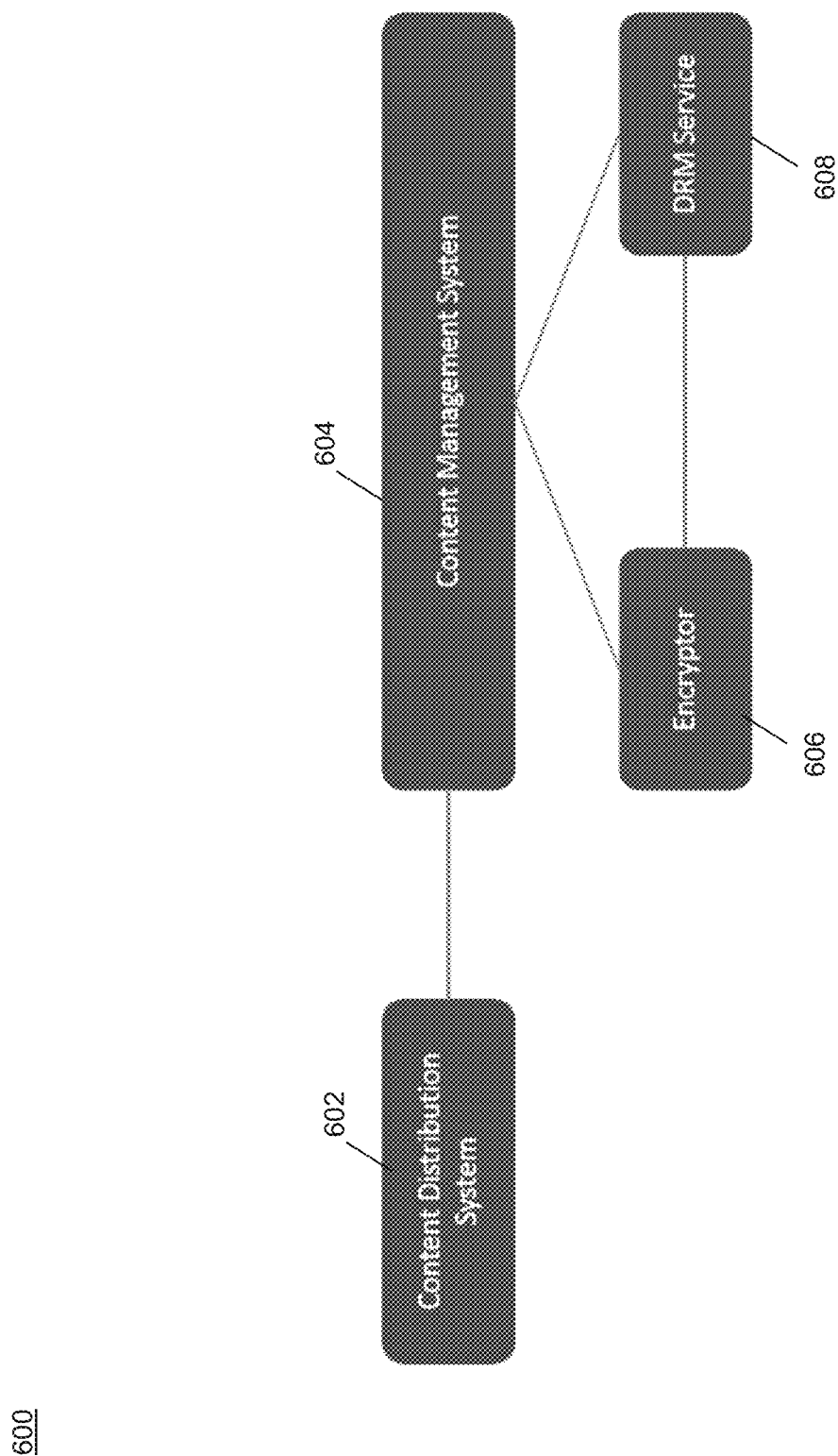
FIG. 6 is an illustrative diagram of a high level system for the management of content by configuring rules for required security capabilities of the content.

FIG. 6 illustrates a system 600 for managing content by configuring rules for required security capabilities of the content. The system 600 may comprise a content distribution system (CDS) 602, a content management system (CMS) 604, an encryptor 606, such as the encryptor 104 of FIGS. 1A and 1B, and a server 608, such as the server 106 of FIGS. 1A and 1B.

The CDS 602 may transmit a plurality of assets to the CMS 604. In one embodiment, each of the plurality of assets may be represented by an asset description. In one embodiment, the asset description may be written in Extensible Markup Language (XML). In another embodiment, the asset description may be written in JavaScript Object Notation (JSON). One of skill in the art will appreciate that any of the multiple asset description languages may be used to write the asset description.

The CMS 604 may configure the server 608 with groups of assets. The group may be identified by a group identification (GroupID). The GroupID may be configured to reference a shared set of required security capabilities of the group in the server 608. The CMS 604 may further correspond required security capabilities with the group in the server 608. The assets that may become part of the group may not be specified when the group is first created. In one embodiment, the CMS 604 may change the required securities capabilities of group in the server 608.

The CMS 604 may provision the encryptor 606 to communicate the group to which an asset belongs during an encryption request for the asset. In one embodiment, such as further discussed hereinbelow with reference to FIG. 9, the encryption request may comprise the GroupID and an asset identification (AssetID).

Figure 7:
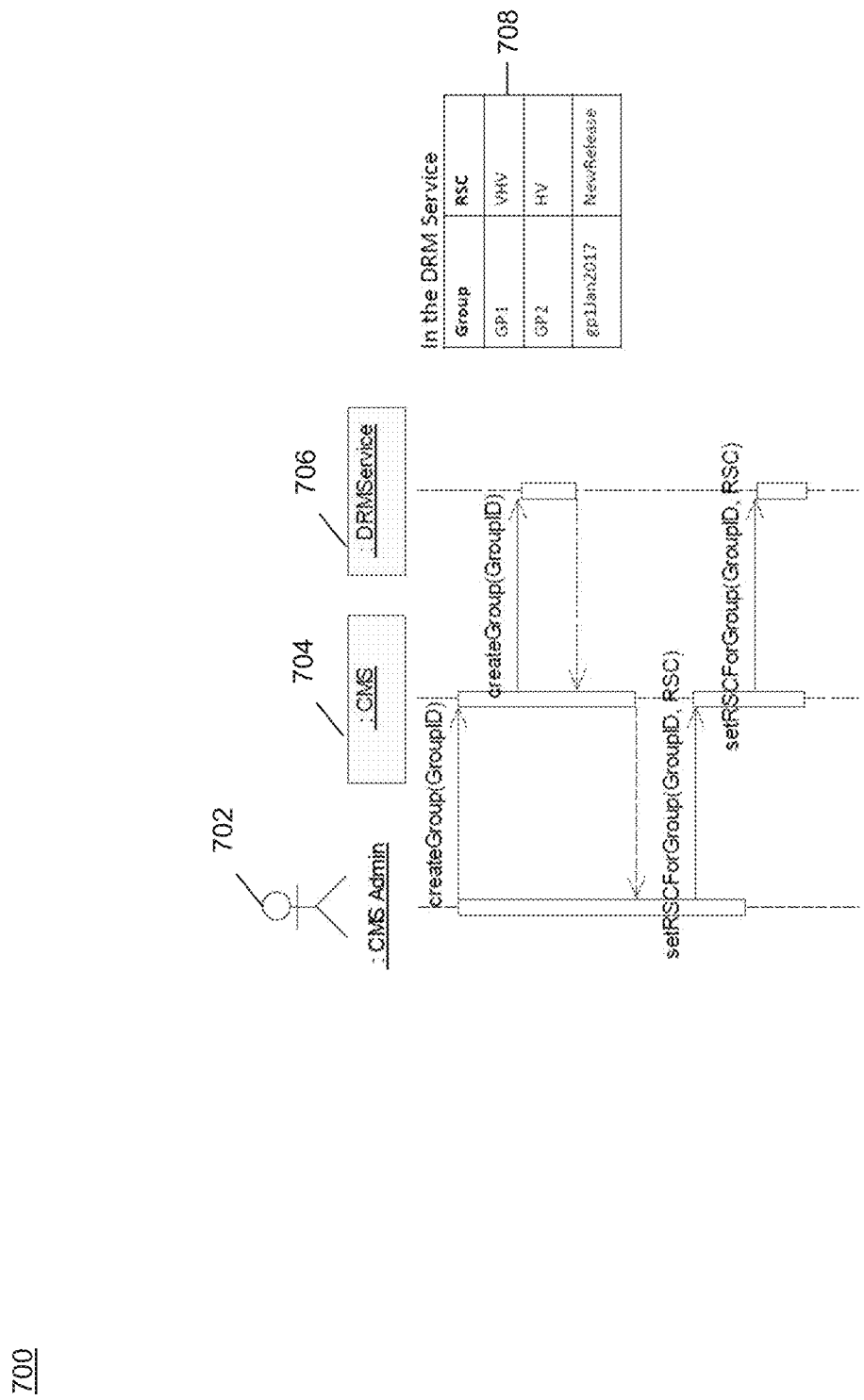
FIG. 7 is a diagram illustrating a process for creating groups of content and associating required security capabilities to the groups.

FIG. 7 illustrates a process 700 for creating groups of content and associating required security capabilities to the groups. The process 700 may comprise a CMS administrator 702 communicating with a CMS 704, such as the CMS 604 of FIG. 6. The CMS 704 may communicate with a server 706, such as the server 106 of FIGS. 1A and 1B.

In one embodiment, the CMS administrator 702 may transmit a create group command to the CMS 704 with a reference to a GroupID for the group. The CMS 704 may communicate the create group command to the server 706 with reference to the GroupID. The server 706 may create a plurality of groups in a database 708 to correspond groups to required securities capabilities. In another embodiment, for example, but not limited to, where the CMS administrator communicates directly with the server 706 and the CMS 704 is not present, the CMS administrator 702 may configure the GroupID and corresponding required securities capabilities directly in the server 706.

In one embodiment, the CMS administrator 702 may transmit a command to correspond a set of required securities capabilities to the group to the CMS 704. The CMS 704 may transmit the command to correspond the set of required securities capabilities to the group to the server 706. The server 706 may correspond the set of required securities capabilities with the group in the database 708. In another embodiment, for example, but not limited to, where the CMS administrator communicates directly with the server 706 and the CMS 704 is not present, the CMS administrator 702 may correspond the set of required securities capabilities to the group directly in the server 706.

In one embodiment, the CMS 704 associates an asset with the group based on required security capabilities of the asset. The required security capabilities of the asset may match the required security capabilities of the group.

In one embodiment, the CMS 704 may be aware of the set of required security capabilities for the group. The CMS 704 may be further configured to provision the server 706 with a new set of required security capabilities for the group.

Figure 8:
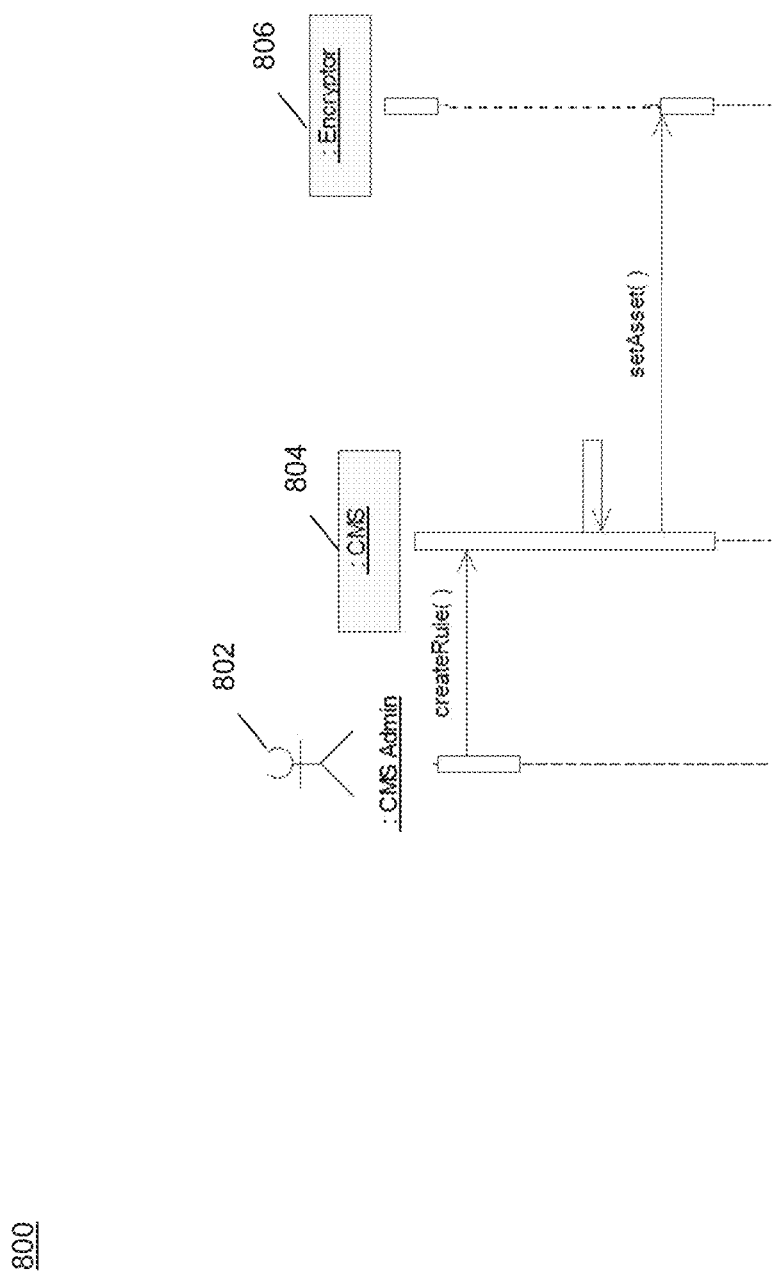
FIG. 8 is a diagram illustrating a process for executing rules related to groups of content and associated required security capabilities.

FIG. 8 illustrates a process 800 for executing rules related to groups of content and associated required security capabilities. The process 800 may comprise a CMS administrator 802 communicating with a CMS 804, such as the CMS 604 of FIG. 6. The CMS 804 may communicate with an encryptor 706, such as the encryptor 104 of FIGS. 1A and 1B.

The CMS administrator 802 may transmit a create rule command to the CMS 804. The CMS 804 may perform a periodic execution of rules against any new assets that may have been received from a content distribution system, such as the CDS 602 of FIG. 6. The CMS 84 may allow for a rule to be specified that may determine a set of required security capabilities for an asset. The rule may comprise at least one condition that may evaluate and/or determine the set of required security capabilities for the asset. The at least one condition may be based on an asset description, such as the asset description of FIGS. 6 and 7.

A time when the CMS 804 may perform the execution of the rules may be configurable. In one embodiment, the CMS 804 may be configured to execute the rules periodically against any new assets that may have been received from the CDS. The CMS 804 may transmit a set asset command to the encryptor 806 to configure the encryptor 806 with a set of AssetIDs and GroupIDs.

Figure 9:
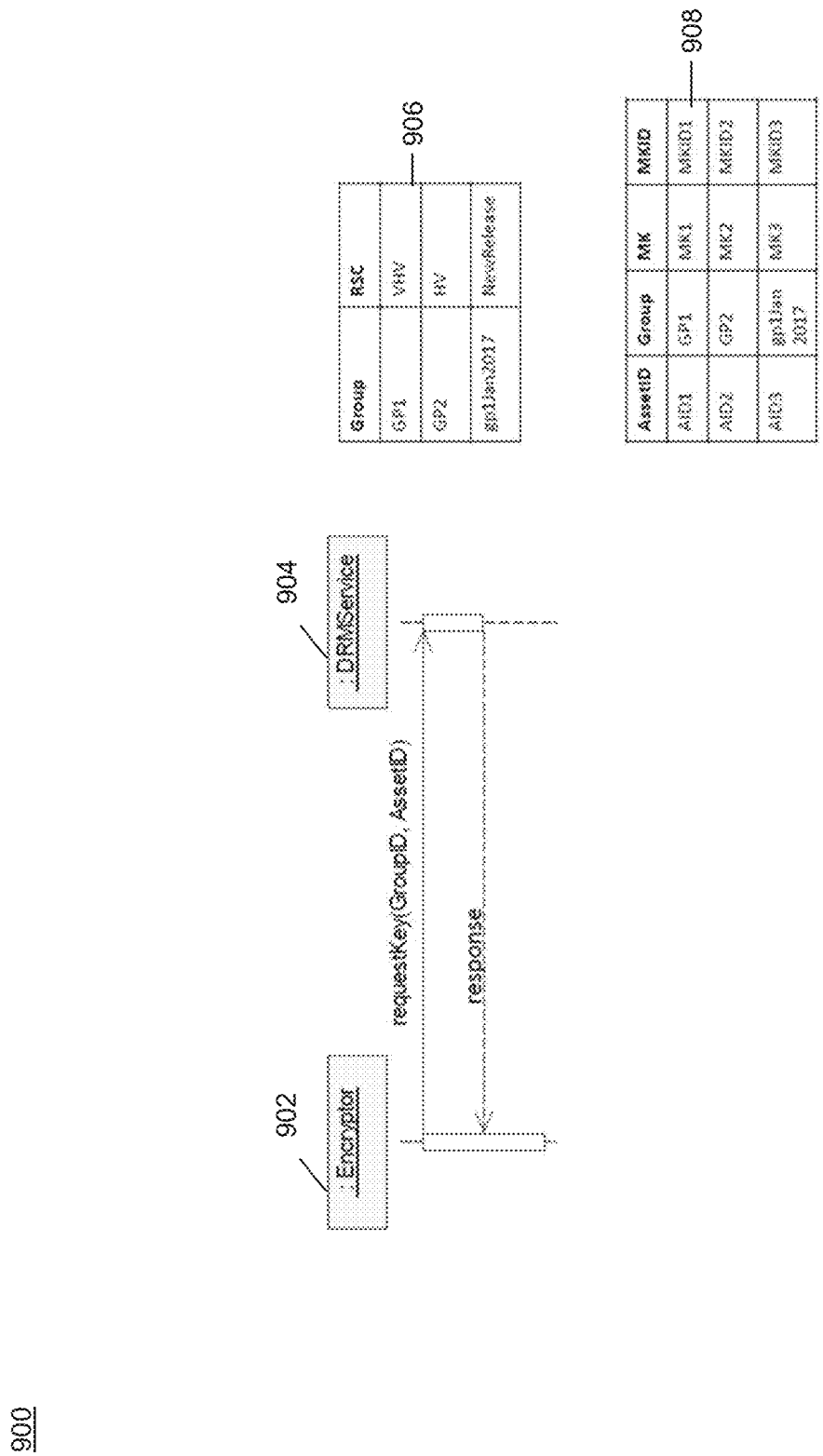
FIG. 9 is a diagram illustrating a process for requesting an encryption key corresponding to content in a group of content.

FIG. 9 illustrates a process 900 for requesting an encryption key corresponding to content in a group of content. The process 900 may comprise an encryptor 902, such as the encryptor 104 of FIGS. 1A and 1B, which may transmit an encryption key request to a server 904, such as the server 106 of FIGS. 1A and 1B. In one embodiment, the encryption key request may comprise an AssetID and a corresponding GroupID.

The server 904 may access a first database 906 with groups and corresponding sets of required security capabilities. The server 904 may also access a second database 908 with groups and corresponding AssetIDs, media keys, and media key identifications. The media key may be used in encryption of the asset.

The server 904, in response to a sufficient encryption key request, may transmit a response to the encryptor 902. In one embodiment, the response may comprise at least one of a content encryption key, a media key identification, encryption information used by a player to obtain the content encryption key, and a structure where the content encryption key may be encrypted with the media key.

The server 904, in response to receiving the encryption key request from the encryptor 902, may assign the asset to the group identified by the GroupID in the encryption key request. The set of required security capabilities corresponding to the group may be determined to be applicable to the asset.

In another embodiment, the encryption key request may comprise the AssetID. In a scenario where the server 904 is not aware of the corresponding GroupID, the server 904 may query a CMS, such as the CMS 604, 704, 804 of FIGS. 6, 7, and 8. In a scenario where the server 904 is already aware of the corresponding GroupID, the server 904 may transmit the GroupID to the encryptor 902.

In a scenario where the CMS is not aware of the GroupID, the CMS may parse metadata of the content, according to rules specified in the CMS, to determine the GroupID. The metadata may include attributes such as, but not limited to, resolution of the content, quality of the content, date the content was released, and other metadata known to those of ordinary skill in the art. In one embodiment, for example, the resolution and quality of content, as well as the release date may be used to find a group of content with similar metadata. The metadata may have a direct impact on the required security capabilities of the group. The CMS may then respond to the server 904 with the GroupID. In a scenario where the CMS is already aware of the GroupID, the CMS may transmit the GroupID to the server 904.

In response to receiving the GroupID from the CMS, the server 904 may correspond the GroupID with the corresponding asset and store the correspondence in at least one of the first database 906 and the second database 908. In one embodiment, the server 904 may optionally respond to the encryption key request from the encryptor 902 by transmitting the GroupID enabling the encryptor 902 to include the GroupID in subsequent encryption key requests.

Techniques consistent with the present disclosure provide, among other features, systems and methods for configuring required security capabilities. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for protecting content, comprising:
   receiving, from a client device, a request for an encryption key for encrypting the content comprising a reference associated with the client device;
   identifying a set of supported security capabilities corresponding to the reference associated with the client device, the set of supported security capabilities identified by a decryption key identification that refers to a key pair comprising a public key and a private key;
   identifying a set of required security capabilities corresponding to the content associated with the key request;
   determining if the set of supported security capabilities satisfy the set of required security capabilities; and
   in response to determining that the supported security capabilities satisfy the set of required security capabilities, transmitting the encryption key to the client device.

2. The method according to claim 1, further comprising, in response to determining that the supported security capabilities do not satisfy the set of required security capabilities, withholding the encryption key from the client device.

3. The method according to claim 1, wherein the client device comprises an asset decryptor.

4. The method according to claim 1, wherein determining if the set of supported security capabilities satisfy the set of required security capabilities comprises determining if the set of supported security capabilities includes at least the set of required security capabilities.

5. The method according to claim 4, wherein determining if the set of supported security capabilities satisfy the set of required security capabilities comprises determining if the set of supported security capabilities exactly matches the set of required security capabilities.

6. The method according to claim 1, wherein the content comprises media content comprising at least one of audio content and video content.

7. The method according to claim 6, wherein the content further comprises a media manifest used by a playing device for retrieving and decrypting the media content to be played on the playing device.

8. The method according to claim 6, wherein the encryption key comprises a media encryption key.

9. The method according to claim 1, wherein the set of supported security capabilities are configured to be ordered by increasing security capabilities listed in the set of required security capabilities.

10. The method according to claim 9, wherein the determining if the set of supported security capabilities satisfy the set of required security capabilities comprises determining if the set of supported security capabilities are equal or greater to the required security capabilities.

11. A digital rights management system comprising:
    a receiving device for receiving an encryption key request from a client device;
    a transmitting device for transmitting the encryption key to the client device;
    a first database for storing a set of supported security capabilities corresponding to client device;
    a second database for storing a set of required security capabilities corresponding to at least one of the encryption key and content associated with the encryption key; and
    a processing device configured to:
    identify, in the first database, the set of supported security capabilities corresponding to the client device, the set of supported security capabilities identified by a decryption key identification that refers to a key pair comprising a public key and a private key;
    identify, in the second database, the set of required security capabilities corresponding to the content associated with the encryption key;
    determine if the set of supported security capabilities satisfy the set of required security capabilities; and
    in response to determining that the supported security capabilities satisfy the set of required security capabilities, transmit the encryption key to the client device via the transmitting device.

12. The digital rights management system according to claim 11, wherein the processing device is further configured to, in response to determining that the supported security capabilities do not satisfy the set of required security capabilities, withhold the encryption key from the client device.

13. The digital rights management system according to claim 11, wherein the processing device being configured to determine if the set of supported security capabilities satisfy the set of required security capabilities comprises the processing device being configured to determine if the set of supported security capabilities exactly matches the set of required security capabilities.

14. The digital rights management system according to claim 11, wherein the processing device being configured to determine if the set of supported security capabilities satisfy the set of required security capabilities comprises the processing device being configured to determine if the set of supported security capabilities includes at least the set of required security capabilities.

15. The digital rights management system according to claim 11, wherein the content comprises media content comprising at least one of audio content and video content.

16. The digital rights management system according to claim 15, wherein the content further comprises a media manifest used by a playing device for retrieving and decrypting the media content to be played on the playing device.

17. The digital rights management system according to claim 15, wherein the encryption key comprises a media encryption key.

18. The digital rights management system according to claim 11, further comprising a server.

19. The digital rights management system according to claim 18, wherein at least one of the set of supported security capabilities and the set of required security capabilities is configured in the server.

20. The digital rights management system according to claim 19, wherein the set of supported security capabilities being configured in the server comprises an administrator specifying which required security capabilities are associated with particular content, and wherein the set of required security capabilities being configured in the server comprises the administrator which supported security capabilities are associated with a particular client device.

* * * * *